(12) United States Patent
Hansen

(10) Patent No.: US 10,870,177 B2
(45) Date of Patent: Dec. 22, 2020

(54) MODULAR WELDING HEAD ASSEMBLY

(71) Applicant: ESAB AB, Gothenburg (SE)

(72) Inventor: Edward E. Hansen, Gothenburg (SE)

(73) Assignee: ESAB AB, Gothenburg (SE)

( * ) Notice: Subject to any disclaimer, the term of this patent is extended or adjusted under 35 U.S.C. 154(b) by 543 days.

(21) Appl. No.: 15/630,729

(22) Filed: Jun. 22, 2017

(65) Prior Publication Data

US 2018/0369966 A1 Dec. 27, 2018

(51) Int. Cl.
*B23K 28/02* (2014.01)
*B23K 26/348* (2014.01)
*B23K 9/32* (2006.01)
*B23K 20/00* (2006.01)

(52) U.S. Cl.
CPC ............ *B23K 28/02* (2013.01); *B23K 26/348* (2015.10); *B23K 9/323* (2013.01); *B23K 20/004* (2013.01)

(58) Field of Classification Search
CPC ........ B23K 28/02; B23K 26/348; B23K 9/32; B23K 9/323
See application file for complete search history.

(56) References Cited

U.S. PATENT DOCUMENTS

| | | | | |
|---|---|---|---|---|
| 4,582,979 | A | * | 4/1986 | Moerke ................. B23K 9/285 219/137.2 |
| 5,258,599 | A | * | 11/1993 | Moerke ................. B23K 9/295 219/121.45 |
| 6,844,521 | B2 | | 1/2005 | Staufer et al. |
| 2002/0134768 | A1 | * | 9/2002 | Akaba ................. B23K 26/0604 219/121.63 |
| 2004/0026388 | A1 | | 2/2004 | Staufer et al. |
| 2007/0145028 | A1 | * | 6/2007 | Artelsmair ........... B23K 26/348 219/137.71 |
| 2012/0261393 | A1 | | 10/2012 | Nowotny et al. |

OTHER PUBLICATIONS

Notification of Transmittal of International Search Report and Written Opinion including International Search Report and Written Opinion for PCT/IB2018/054469 dated Oct. 29, 2018, 13 pages.

* cited by examiner

*Primary Examiner* — Erin E McGrath
(74) *Attorney, Agent, or Firm* — Edell, Shapiro & Finnan, LLC

(57) ABSTRACT

The present disclosure relates to a system of modular functional blocks that may be used to facilitate easy assembly of a welding head assembly in any one of a wide variety of configurations to allow for distribution of welding wire, gas, cooling fluid and other media throughout an interconnected assembly of the modular functional blocks. As such, the modular functional blocks can be mixed and matched into any desired configuration as needed depending on the welding process being undertaken. The modular functional blocks may be in the form of one or more different welding wire delivery blocks, gas delivery blocks, cooling water delivery blocks, shim plates, end plates, shield cup, cover plates, insulating plates, etc.

20 Claims, 13 Drawing Sheets

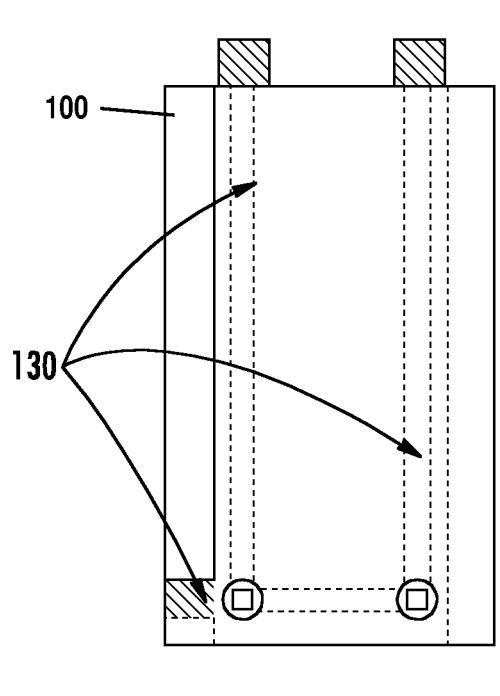
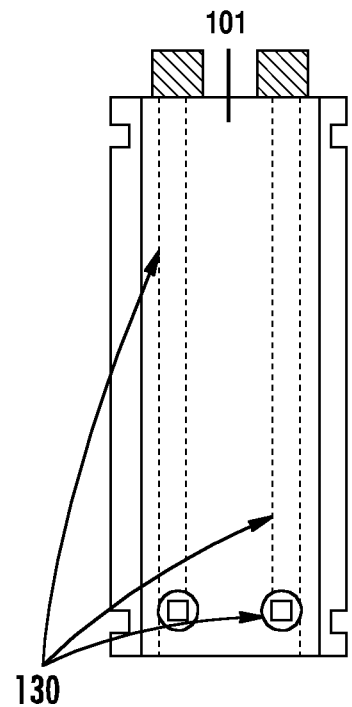
FIG. 3A  FIG. 3B
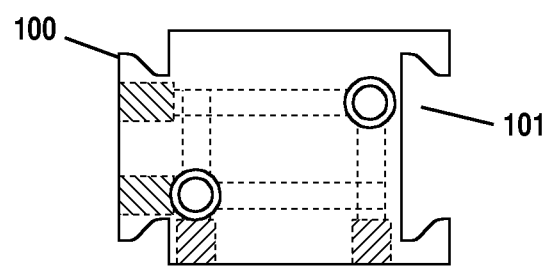
FIG. 3C

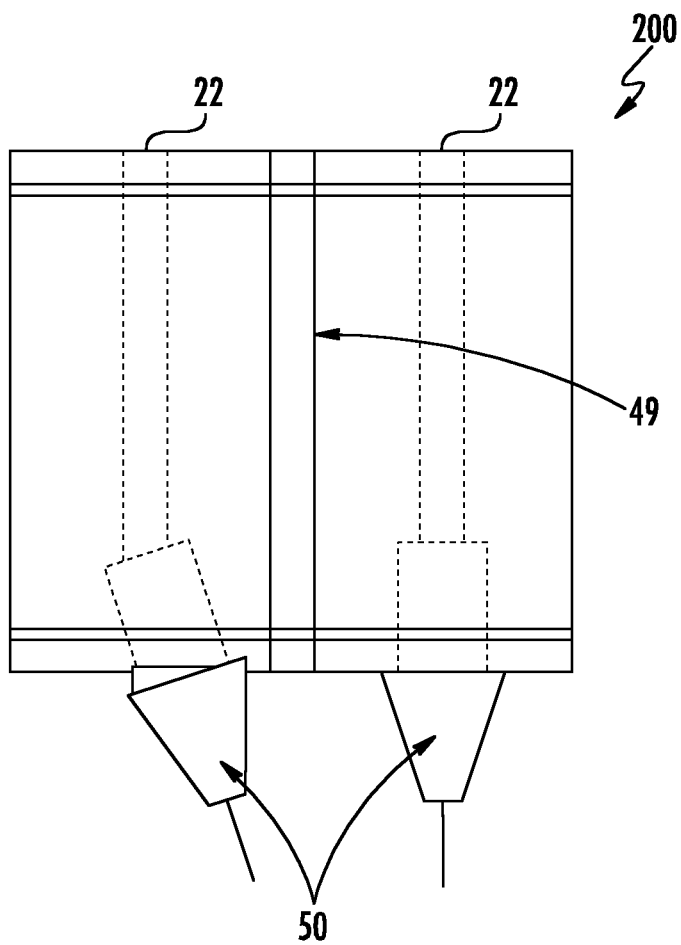 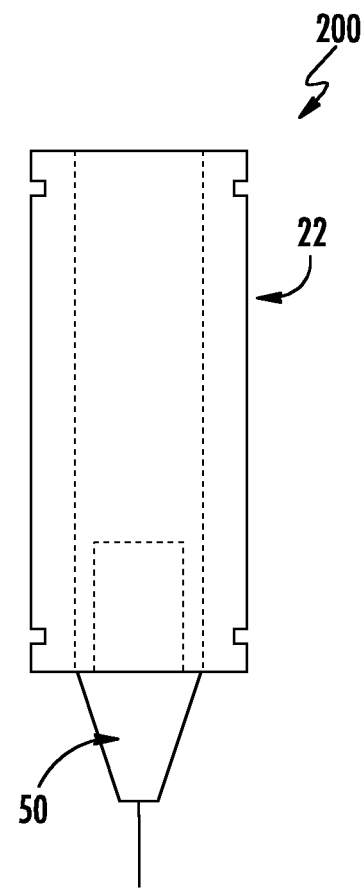
FIG. 4A  FIG. 4B
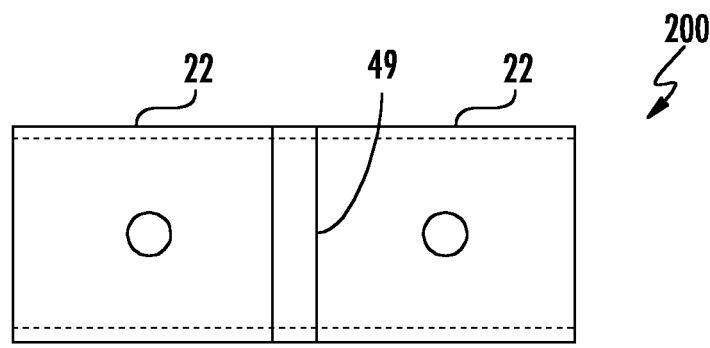
FIG. 4C

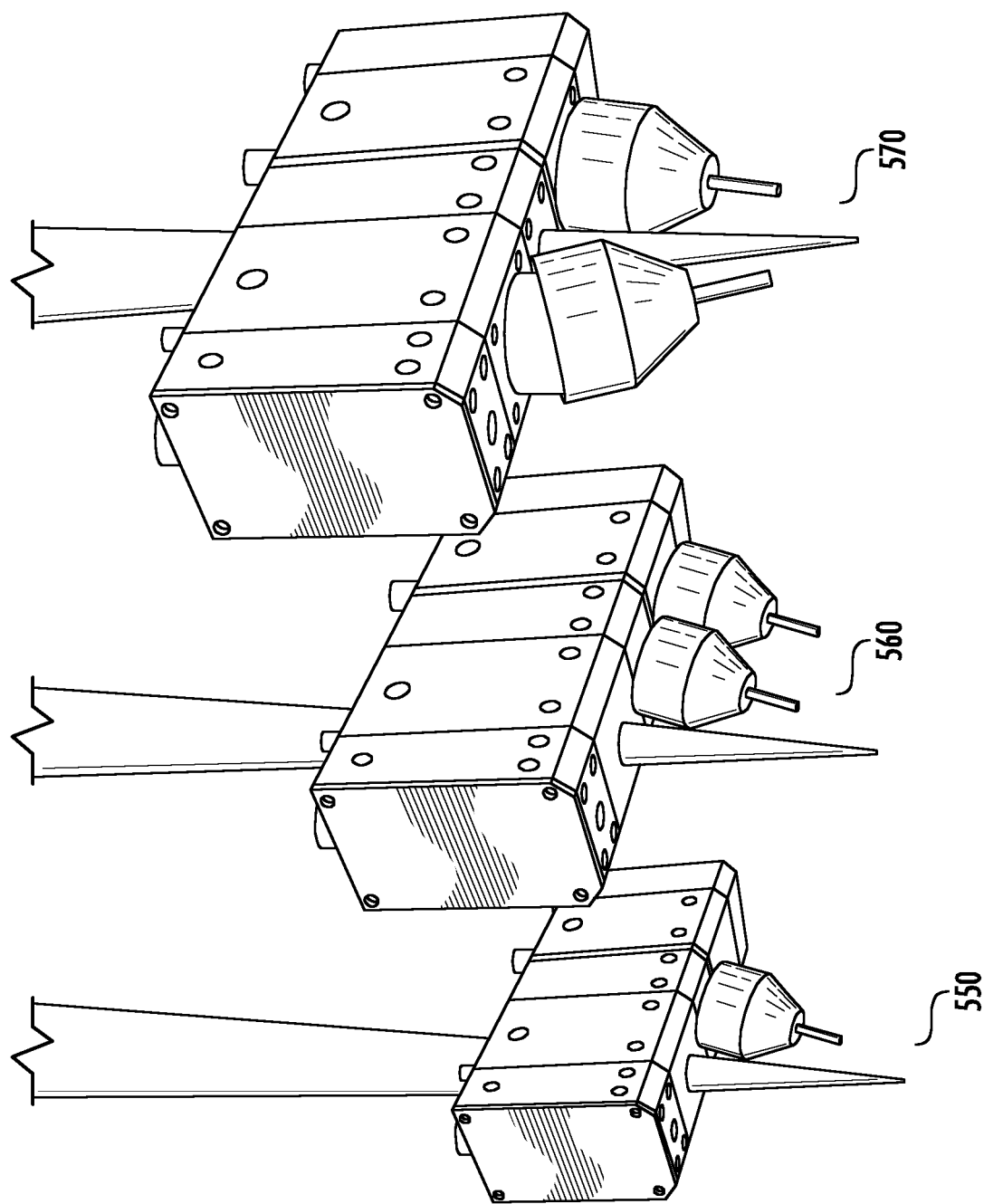

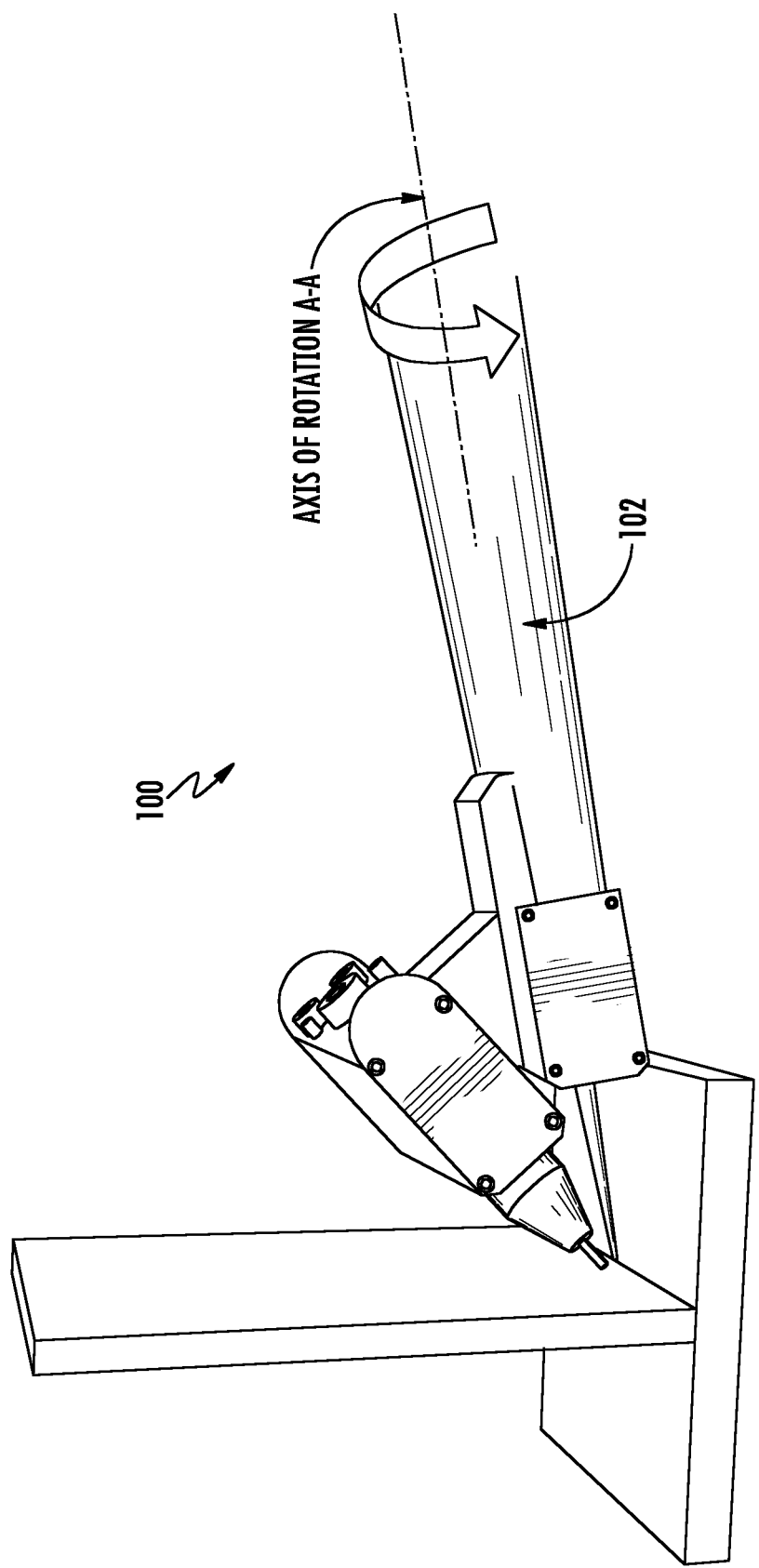

MODULAR WELDING HEAD ASSEMBLY

FIELD OF THE DISCLOSURE

The present disclosure relates generally to a welding head assembly for use in a welding device or system and, more particularly, to a modular welding head assembly that allows for easy individualization and customization of the welding head assembly as desired for a particular application.

BACKGROUND OF THE DISCLOSURE

Welding devices, including hybrid laser welding devices and processes are well known. Such hybrid systems can include a laser component and a welding component such as a gas metal arc welding (GMAW) component or a submerged arc welding (SAW) component. One disadvantage with current hybrid laser welding devices is dealing with the number, placement and management of incoming welding wire and other supporting service lines (e.g., shielding gas delivery, flux delivery, torch tip cooling, etc.). As a result, the size of the welding head assembly may become large and cumbersome.

Current solutions suffer from other disadvantages as well. For example, current concentric or coaxial torch arrangements with torch tip, gas supply, gas diffusion and gas shielding mechanisms that are all arranged coaxially, make it difficult to place multiple torches together in close proximity. Current monolithic twin or tandem torch designs have very limited support for adjustments in the placement of various process components including spacing, work angles and push/drag angles. In a hybrid laser arc welding process, current monolithic torch designs make it difficult to fit multiple welding wires plus gas shielding and cooling in a small space in close proximity to the laser focus position.

It would be beneficial to provide a welding head arrangement that overcomes the aforementioned problems.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a system of modular functional blocks that may be used to facilitate assembly of a welding head in any one of a wide variety of configurations to allow for distribution of welding wire, gas, cooling fluid and other media throughout an interconnected assembly of the modular functional blocks. As such, the modular functional blocks can be mixed and matched into any desired configuration as needed depending on the welding process being undertaken. The modular functional blocks may be in the form of one or more different welding wire delivery blocks, gas delivery blocks, cooling water delivery blocks, shim plates, end plates, shield cup, cover plates, insulating plates, etc. In addition, the modular functional blocks may be in the form of one or more electro-mechanical devices such as, but not limited to, a seam tracker, a camera, a flux delivery block, etc.

In one exemplary embodiment, the present disclosure is directed to a welding head assembly including a plurality of modular functional blocks. Each modular functional block of the plurality of modular functional blocks may be inter-connectable to another one of the plurality of modular functional blocks so that the welding head assembly is configurable in a number of different configurations. The modular functional blocks may include one of a laser beam delivery block, a welding wire delivery block, a gas delivery block, and a fluid delivery block.

Each of the modular functional blocks may include a projection and a recess for interconnecting with said another one of the plurality of modular functional blocks.

Each of the modular functional blocks may include one or more channels for receiving at least one of a fluid and a gas. The channels may include a threaded opening for creating a controlled flow of fluid or gas through the one or more channels within each block. As such, when connected, one of the channels in a first modular functional block of the plurality of modular functional blocks may align with another of the channels in a second modular functional block of the plurality of modular functional blocks to provide for the distribution of the fluid or gas through the welding head assembly. Thus, when connected, a plurality of channels formed in a first modular functional block of the plurality of modular functional blocks may align with a plurality of channels formed in a second modular functional block of the plurality of modular functional blocks to produce a network of channels in the welding head assembly for supplying one or more of gas and fluid.

The welding head assembly may further include one or more of an insulating spacer, an end plate, a cover plate, a shim plate, and a cover. The welding head assembly may also include one or more optional sensor blocks. The sensor block may include one of a touch sensor block, a tactile seam tracker block, an optical seam tracker block and a camera.

In another exemplary embodiment, the present disclosure is directed to a kit of modular functional blocks for configuring and assembling a welding head into any one of a number of different configurations. The kit may include a plurality of modular functional blocks where each modular functional block may be inter-connectable to another modular function block so that the welding head is configurable in a number of different configurations. The plurality of modular functional blocks may include one or more of a laser delivery block, a welding wire delivery block, a gas delivery block, and a fluid delivery block.

In yet another exemplary embodiment, the present disclosure is directed to a method of assembling a welding head. The method may include the steps of selecting one of a plurality of modular functional blocks depending on a welding procedure to be performed and coupling the selected modular functional block to a second modular functional block plurality of modular functional blocks. The plurality of modular functional blocks may include at least one of a laser beam delivery block, a welding wire delivery block, a shield gas block, and a cooling water block. Each of the plurality of modular functional blocks may be inter-connectable to another modular functional block of the plurality of modular functional blocks so that the welding head assembly is configurable in a number of different configurations.

BRIEF DESCRIPTION OF THE DRAWINGS

By way of example, specific embodiments of the disclosed device will now be described, with reference to the accompanying drawings, in which:

FIG. 3A illustrates a front view of an exemplary functional block of the system or kit shown in FIG. 1;

FIG. 3B illustrates a side view of the exemplary functional block shown in FIG. 3A;

FIG. 3C illustrates a top view of the exemplary functional block shown in FIG. 3A;

FIG. 4A illustrates a front view of an illustrative welding assembly for a Gas Metal Arc Welding ("GMAW") system;

FIG. 4B illustrates a side view of the illustrative GMAW welding assembly shown in FIG. 4A;

FIG. 4C illustrates a top view of the illustrative GMAW welding assembly shown in FIG. 4A;

FIG. 8 illustrates a perspective view of a plurality of alternate embodiments of a welding assembly;

FIG. 10 illustrates a perspective view of an exemplary welding head assembly according to the present disclosure arranged to perform a fillet welding procedure.

DETAILED DESCRIPTION

Figure 1:
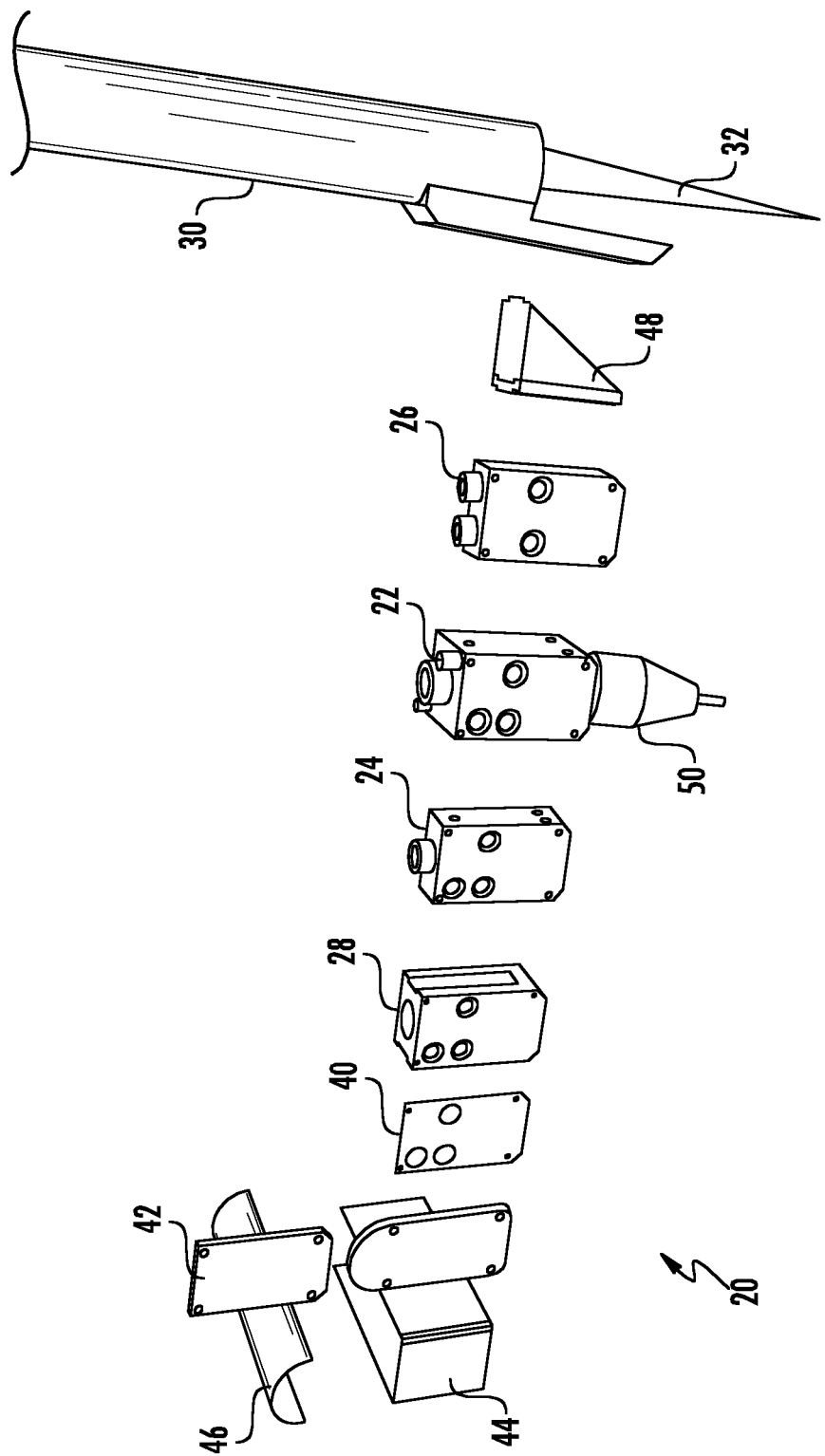
FIG. 1 is a perspective view illustrating the various, illustrative functional blocks and other components that may be offered as part of an exemplary system or kit in accordance with the present disclosure.

A device, system and method in accordance with the present disclosure will now be described more fully hereinafter with reference to the accompanying drawings, in which preferred embodiments of the device, system and method are shown. The disclosed device, system and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

Figure 2:
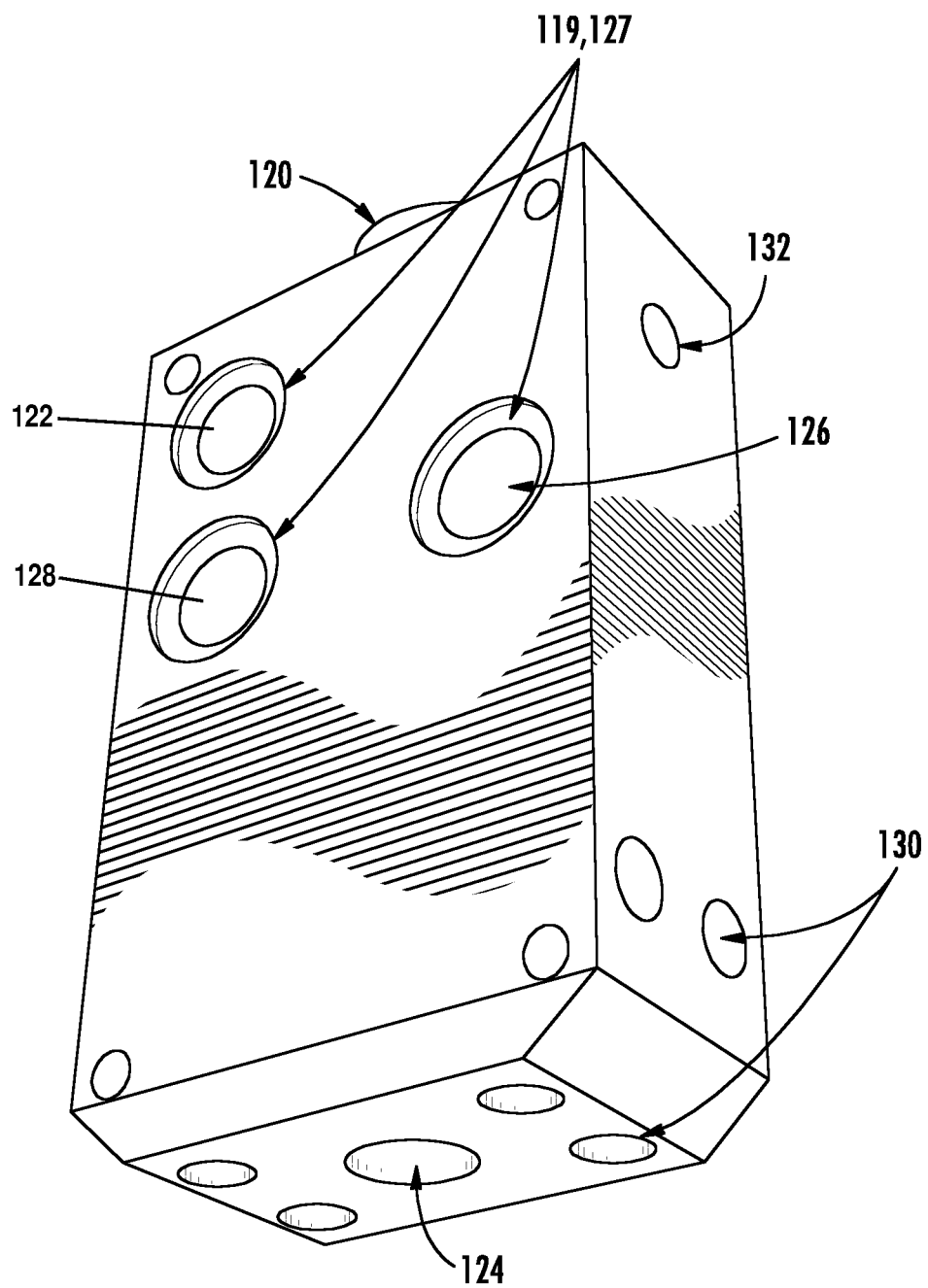
FIG. 2 illustrates a perspective view of an exemplary functional block of the system or kit shown in FIG. 1.

Referring to FIGS. 1 and 2, the present disclosure relates to a system of modular functional blocks 20 that may be offered, for example, as a kit. The modular functional blocks 20 may be used to facilitate easy assembly of a welding head assembly in any one of a wide variety of configurations to allow for distribution of welding wire, gas, cooling fluid and other media throughout an interconnected assembly of the modular functional blocks. As such, the modular functional blocks 20 can be mixed and matched into any desired configuration as needed depending on the welding process being undertaken. For example, referring to FIG. 1, the modular functional blocks 20 may be in the form of one or more different welding wire delivery blocks 22, gas delivery blocks 24, cooling water delivery blocks 26, an aperture block 28 (for example, for receiving the torch or, in the case of a laser welding procedure, the laser optic extension tube 30 and laser focus cone 32 therethrough), a laser beam delivery block 29 (as shown in FIGS. 6A and 6B), etc. along with one or more shim plates 40, end plates 42, shield cups 44, cover plates 46, fillet adapters 48, insulating plates 49 (as shown in FIGS. 4A-5B), etc. The welding wire delivery blocks 22 may be in the form of an arc welding wire delivery block, a flux delivery block, a powdered metal delivery block for delivery additive material, etc. depending on the requirements of the welding procedure being performed. One or more of the shim plates 40 may be used to provide desired separation distance between the various functional blocks 20. That is, one or more shim plates 40 may be used to adjust spacing between different functional blocks 20. In this manner, the shim plates 40 eliminate the need for fine-tuning adjustment spacers that may be used with prior devices. The insulating plates 49 may act as an electrical insulator and thus, may be used to separate, for example, a current-carrying wire delivery block from other blocks. The modular functional blocks 20 may also include one or more contact tips 50 for coupling to, for example, the welding wire delivery block 22 for receiving the welding wire being distributed through the welding wire delivery block 22 and for directing the welding wire in a desired manner. The modular functional blocks 20 may also include one or more sensor blocks 60, (as shown in FIGS. 5A-6B) for example, touch sensor block, tactile seam trackers, optical seam trackers, a camera, etc. Although not shown, the assembly may include a housing to cover the entire assembly or one or more components thereof.

The modular functional blocks 20 may be configured to be interconnected by any means now known or hereafter developed to provide a custom-built assembly. For example, referring to FIGS. 3A-3C, in one embodiment the modular functional blocks 20 may include interconnecting projections 100 and recesses 101 for coupling together. In some embodiments, the projections 100 and slidably mating recesses 101 are disposed on the lateral sides of the modular functional blocks 20. The illustrated embodiment shows that adjacent modular functional blocks 20 may be coupled by a dovetail joint arrangement so that when connected, adjacent blocks 20 are laterally coupled to each other. Alternatively, or in addition, the modular functional blocks 20 may be interconnected by fasteners, etc. For example, the modular blocks 20, shim plates 40, insulating plates 49, etc. may have flat interface surfaces so that the block-to-block, plate-to-block, spacer-to-block, plate-to-spacer, etc. interface may be flat and through bolts or fasteners may be used to secure the spacers, plates, blocks, etc. In this arrangement, referring to FIG. 2, each manifold (e.g., gas manifold 122, water supply manifold 126, water return manifold 128, etc.) may include an annular recess 127 circumferentially surrounding the manifold for receiving a seal, such as, for example, an O-ring to seal the block-to-block, plate-to-block, spacer-to-block, plate-to-spacer, etc. connection.

Referring to FIGS. 3A-3C, each of the individual modular functional blocks 20 may include one or more internal channels 130 to allow fluids (e.g., liquid and/or gas) to flow between interconnected modular blocks 20. That is, the functional blocks 20 may include one or more channels 130 formed therein so that gas and/or cooling water may be distributed to the individual components of the system through the interconnected functional blocks. In addition, referring to FIG. 2, one or more of the functional blocks may include a manifold 119 for providing gas or fluid distribution from one modular functional block 20 to the next modular functional block. The manifolds 119 may have a larger diameter as compared to the cooling channels 130. In addition, the cooling channels 130 may intersect with the manifolds 119 to circulate, for example, fluid or gas three-dimensionally through each function block 20. Each manifold 119 may include a recessed boss 127 (e.g., an enlarged opening) around a circumferential of the manifold 119 for receiving a seal, such as, for example, an O-ring to seal the block-to-block, plate-to-block, spacer-to-block, plate-to-spacer, etc. connection. For example, the functional blocks 20 may include a gas inlet port 120, a gas manifold 122, a gas diffuser port 124, a water supply manifold 126, and a water return manifold 128. In addition, the functional blocks 20 may include cooling channels 130. The functional blocks 20 may also include an access hole 132 for receiving a threaded orifice for controlling the gas flow from the main gas supply manifold to the gas channel within that block. In use, the channels, ports and manifolds may create a network of openings and passages for supplying gas and/or cooling water flow between the various interconnected modular blocks so that gas and/or water supply and return tubing can be connected to the system to provide and/or recirculate gas and/or liquid through the functional blocks 20.

A water delivery block 26 may provide distribution of cooling water. A gas delivery block 24 may provide distribution of gas. That is, the blocks 24, 26 may include one or more manifolds, channels, inlets and outlets for distributing water and gas within the block and to adjacent connected blocks. The blocks 20 may further include threaded openings and threaded plugs for sealing the ends of the manifolds, channels, inlets, outlets where required. That is, the manifolds, channels, inlets, outlets may include threaded openings for receiving threaded plugs to create controlled flow channels within each block for distribution and metering of gas and fluid. The threaded plugs and orifices (not shown) can be threaded into the threaded openings to control/meter flow rates of the gas or fluid passed therethrough. As previously described, O-rings (not shown) may be provided between the functional blocks 20 to ensure proper sealing between blocks 20 to ensure fluid and gas integrity. For example, an O-ring may be placed between corresponding openings of adjacent modular functional blocks 20.

The modular functional blocks 20 may be made from any suitable material now known or hereafter developed, for example, the functional blocks may be made from a suitable metal such as brass. In addition, the functional blocks 20 can vary in size and shape to suit a desired application.

In use, the welding head assembly may be decomposed into individual, modular functional blocks 20 where each block 20 may be responsible for one or more of gas, wire and cooling distribution. As will be appreciated, the disclosed arrangement can allow the user to mix and match the individual blocks to achieve a desired welding head configuration for the welding process being performed. As such, the modular functional blocks 20 may provide a wide variety of configurations for a welding head assembly.

Referring to FIGS. 4A-4C, an exemplary embodiment of a welding assembly 200 for a Gas Metal Arc Welding ("GMAW") process is shown. The GMAW variant welding assembly 200 may include first and second welding wire delivery blocks (e.g., arc welding wire) 22 separated by an insulating spacer 49. Each of the first and second welding wire delivery blocks 22 may be coupled to, or may incorporate, a contact tip 50 for introducing a welding wire to a desired location below the assembly. Although not shown in FIGS. 4A-4C, it will be appreciated that the GMAW welding assembly variant 200 may also include one or more gas delivery blocks 24, cooling water delivery blocks 26, aperture blocks 28, shim plates 40, end plates 42, shield cups 44, cover plates 46, insulating plates 49 and other blocks as desired.

Figure 5A:
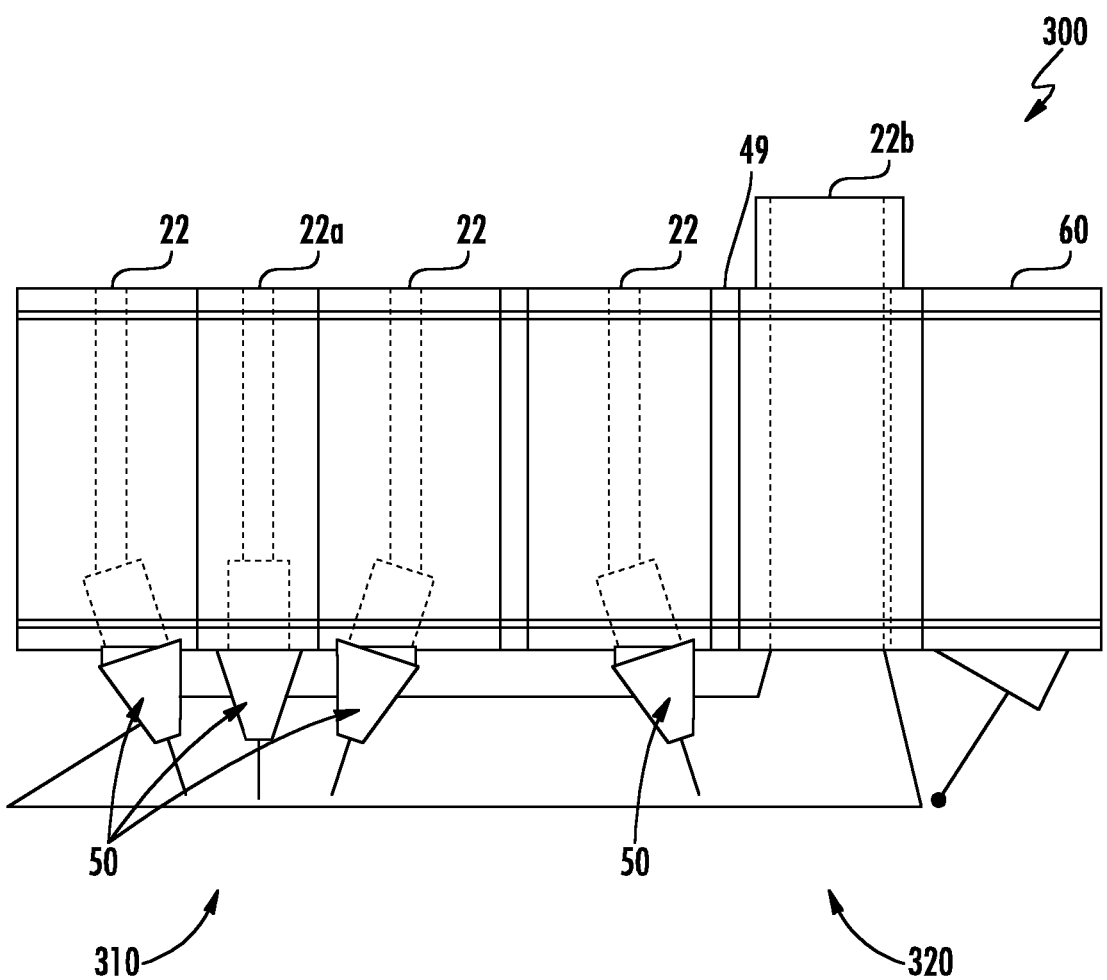
FIG. 5A illustrates a front view of an illustrative welding assembly for a Sub Arc Welding ("SAW") system.
Figure 5B:
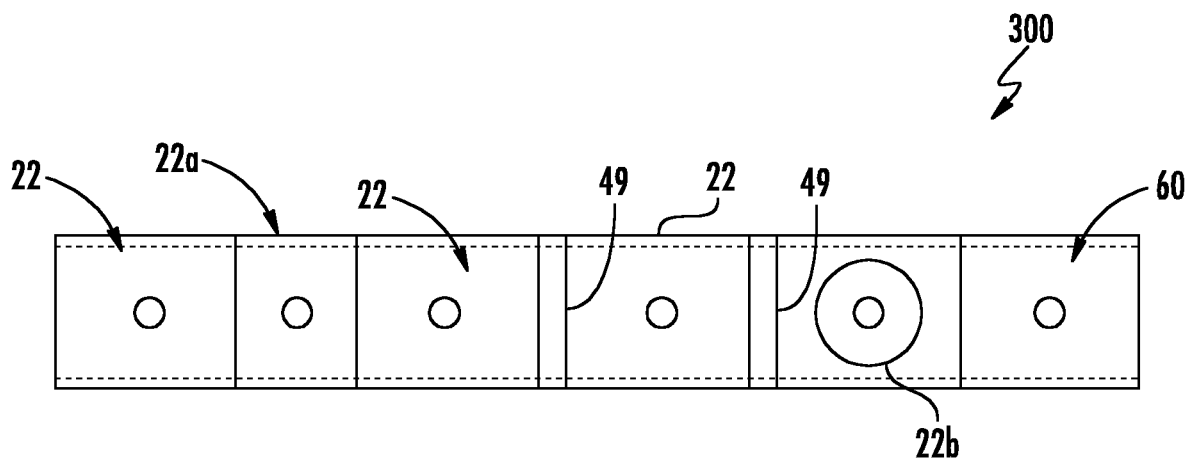
FIG. 5B illustrates a top view of the illustrative SAW welding assembly shown in FIG. 5A.
Figure 6A:
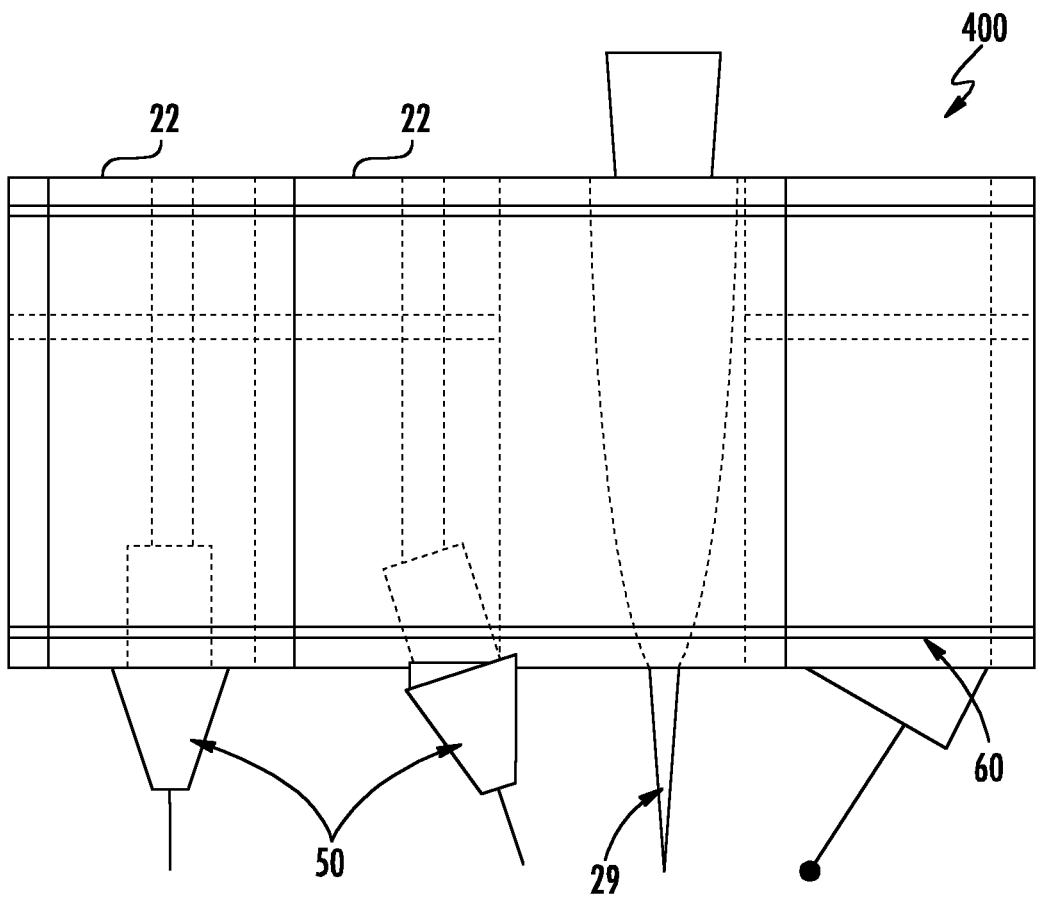
FIG. 6A illustrates a front view of an illustrative welding assembly for a Hybrid Laser Arc Welding ("HLAW") system.
Figure 6B:
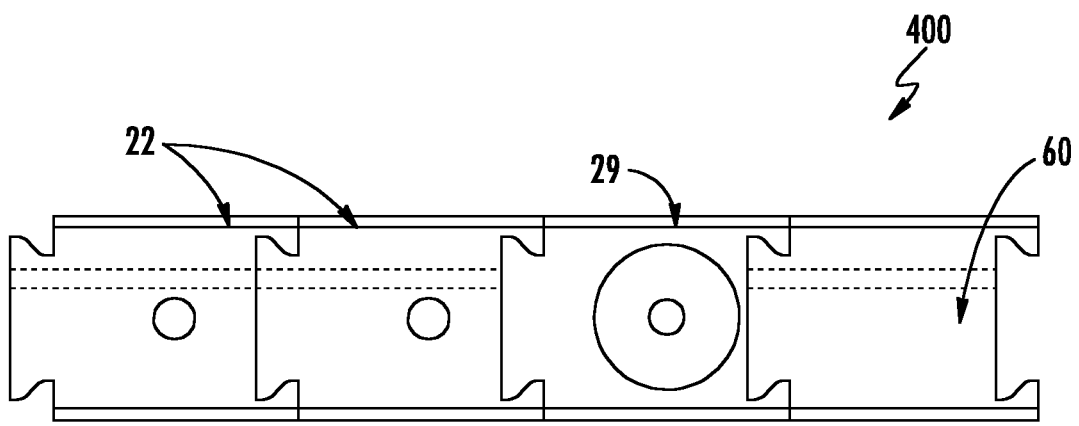
FIG. 6B illustrates a top view of the illustrative HLAW welding assembly shown in FIG. 6A.
Figure 7A:
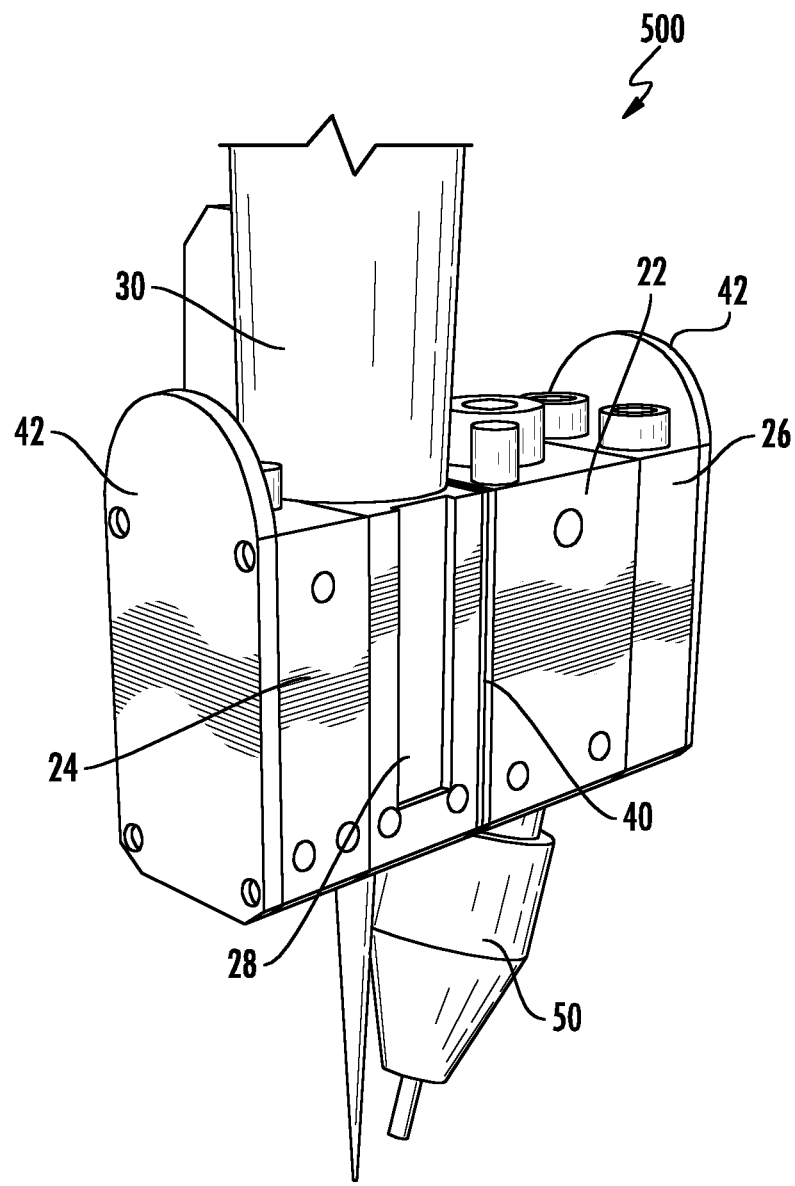
FIG. 7A illustrates a perspective view of an embodiment of a welding assembly for a HLAW system with a single arc trailing process.
Figure 7B:
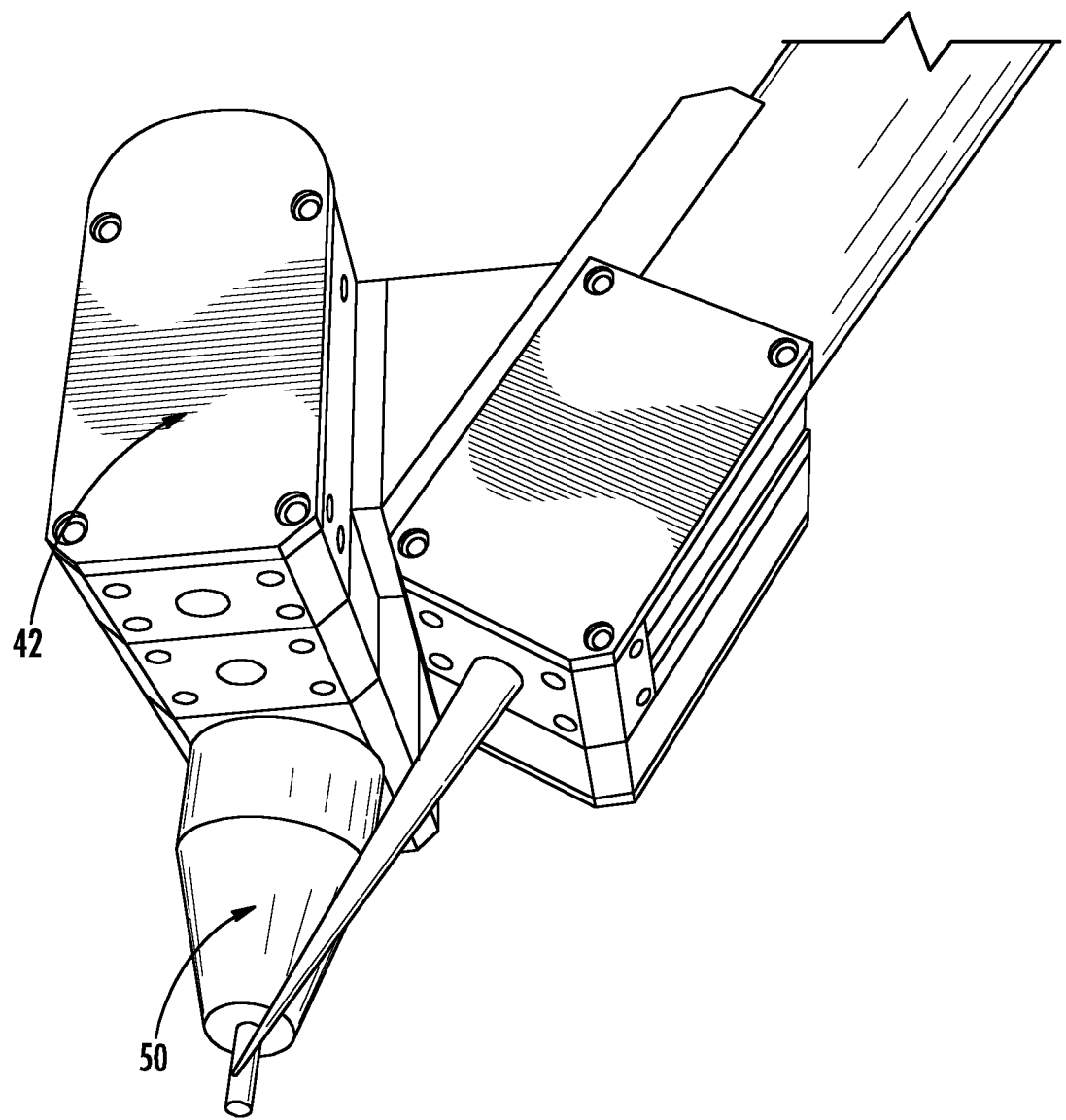
FIG. 7B illustrates a perspective view of the HLAW welding assembly shown in FIG. 7A.
Figure 7C:
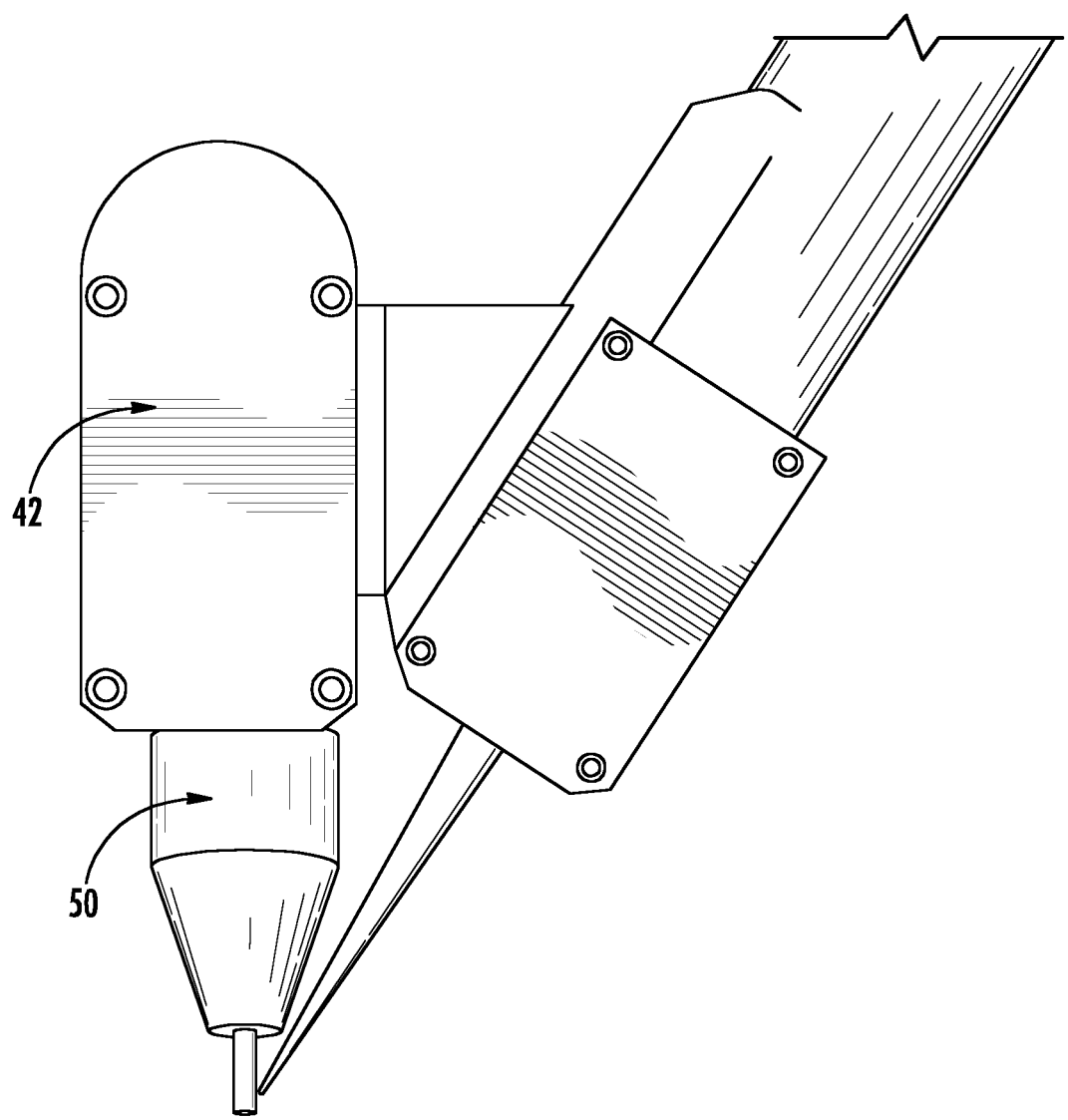
FIG. 7C illustrates a side view of the HLAW welding assembly shown in FIG. 7A.
Figure 7D:
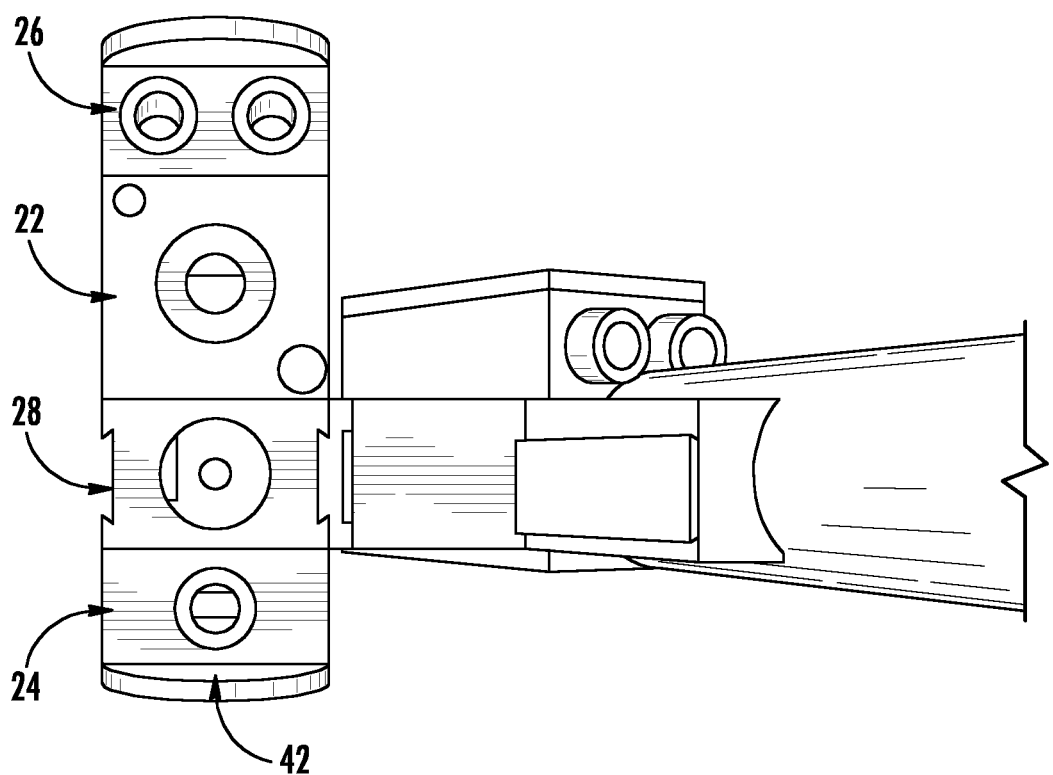
FIG. 7D illustrates a top view of the HLAW welding assembly shown in FIG. 7A.

Referring to FIGS. 5A and 5B, an exemplary embodiment of a welding assembly 300 for a Submerged Arc Welding ("SAW") process is shown. The SAW variant welding assembly 300 may include first and second subassemblies 310, 320. The first subassembly 310 may include first and second welding wire delivery blocks (e.g., arc welding wire) 22 on either side of a third welding wire delivery block (e.g., neutral wire delivery block) 22a. Each the welding wire delivery blocks may be coupled to, or may incorporate, a contact tip 50 for introducing a welding wire to a desired location below the assembly. The second subassembly 320 may include a welding wire delivery block (e.g., arc welding wire), a flux delivery block 22b and a sensor block (e.g., a tactile seam tracking sensor block) 60. The welding wire delivery block 22 may be coupled to, or may incorporate, a contact tip 50. The first and second subassemblies 310, 320 may be separated by one or more insulating plates 49. The flux delivery block 22b may be separated from the arc welding wire delivery block 22 by one or more insulating plates 49. As will be appreciated and not shown in FIGS. 5A and 5B, the SAW welding assembly variant 300 may also include one or more gas delivery blocks 24, cooling water delivery blocks 26, aperture blocks 28, shim plates 40, end plates 42, shield cups 44, cover plates 46, insulating plates 49 and other blocks as desired.

Referring to FIGS. 6A and 6B, an exemplary embodiment of a welding assembly 400 for a Hybrid Laser Arc Welding ("HLAW") process is shown. The HLAW welding assembly variant 400 may include a laser beam delivery block 29, first and second welding wire delivery blocks 22, and a sensor block (e.g., tactile seam tracking sensor block) 60. The welding wire delivery blocks 22 may be coupled to, or incorporate, a contact tip 50. As will be appreciated, the HLAW welding assembly variant 400 may also include, although not shown in FIGS. 6A and 6B, one or more gas delivery blocks 24, cooling water delivery blocks 26, aperture blocks 28, shim plates 40, end plates 42, shield cups 44, cover plates 46, insulating plates 49 and other blocks as required.

As will be appreciated by one of ordinary skill in the art, the modular functional blocks 20 can allow the end user to simply and effectively reconfigure the assembly by adding, removing and/or altering the blocks as desired for the requirements of the welding procedure being performed. For example, referring to FIGS. 7A-7D, an exemplary embodiment of a welding assembly 500 for a single arc trailing process is shown. The welding head assembly 500 may include a welding wire delivery block 22 coupled to, or incorporating, a contact tip 50, a gas delivery block 24, a cooling water delivery block 26, an aperture block 28 for receiving a laser optic extension tube 30 (for forming a laser focus cone), one or more shim plates 40, end plates 42, and a shield cup 44 and cover plate 46 (not shown in FIGS. 7A-7D for clarity).

FIG. 8 illustrates how a plurality of different welding head assemblies can be constructed using the aforementioned components to construct a single arc trailing welding assembly 550, a tandem arc trailing welding assembly 560, and a tandem arc lead-lag welding assembly 570, just by adding or altering the assembled configuration of the modular functional blocks 20. In some embodiments, these different welding head configurations can be "built" by the user, while in other embodiments a desired configuration may be manufactured and provided to the user in a consolidated form.

Figure 9:
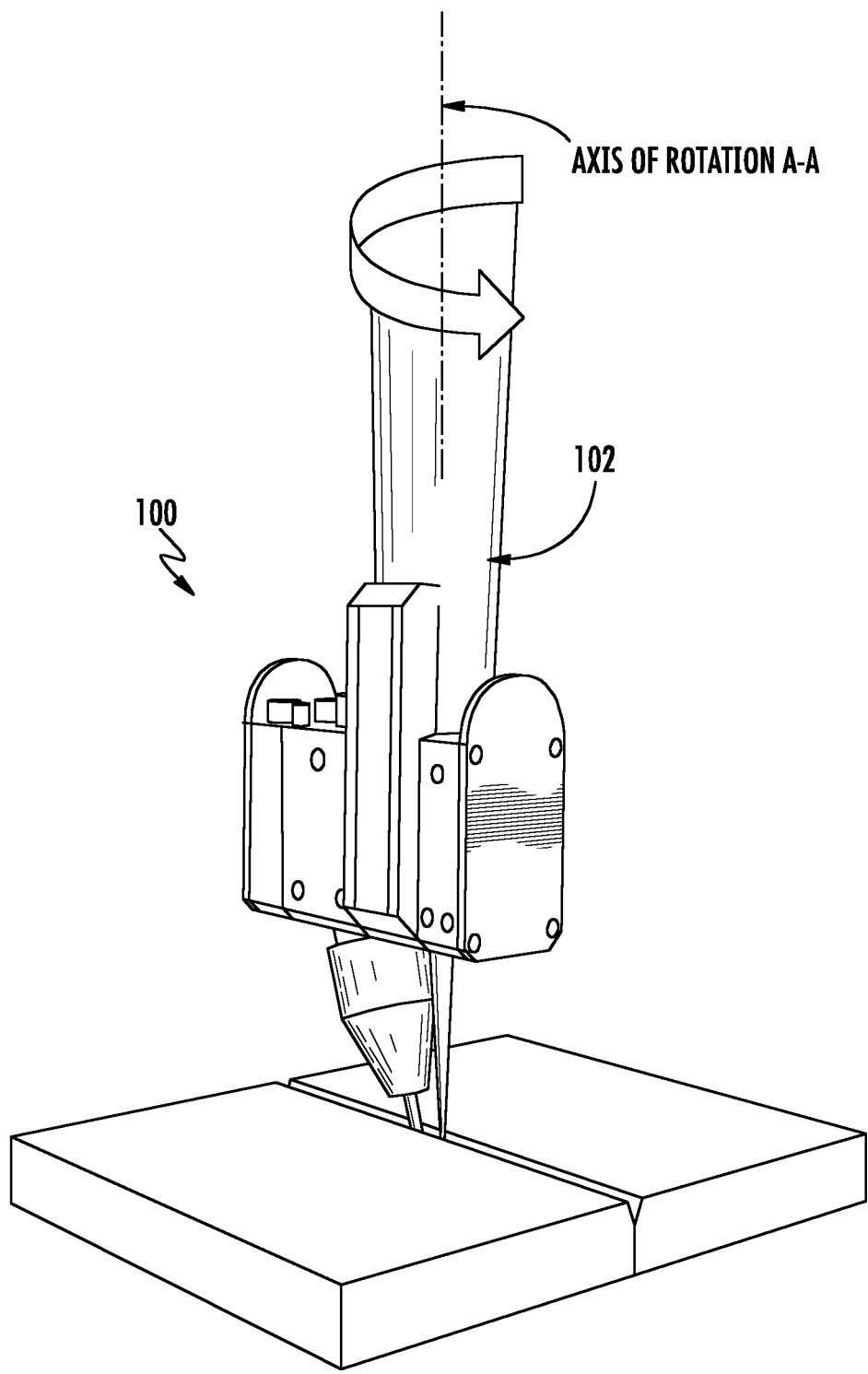
FIG. 9 illustrates a perspective view of an exemplary welding head assembly according to the present disclosure arranged to perform a butt welding procedure.

In addition, the welding head assembly 100 may be arranged so that the entire assembly is rotatable about an axis to enable an additional degree of rotation. Referring to FIGS. 9 and 10, the modular welding head assembly 100 may be rotatably coupled to a welding arm 102 so that the rotational position of the welding head assembly can be adjusted depending on the type of welding procedure employed and the workpieces being welded. For example, FIG. 9, illustrates the position of the welding head assembly for a butt welding process, and the welding head assembly may be rotatable about axis "A-A" to adjust the relative rotational positions of the laser head and the arc welding head. FIG. 10 illustrates the position of the welding head assembly for a fillet weld process, with the welding head assembly rotatable about axis "A-A" to adjust the relative rotational positions of the laser head and the arc welding head.

By breaking down the conventional welding head assembly into individually designated functional blocks, the disclosed system enables the user to customize a welding head assembly using a common group of components. The disclosed system also enables the user's ability to position the incoming welding wires and other supporting service lines in closer proximity to each other and to position the functional blocks in closer proximity to the laser beam than is possible with conventional torches. In addition, the modular functional blocks may improve the user's ability to easily combine critical components in a wide range of different combinations and sequences, to eliminate multiple redundant media delivery and distribution systems through the use of common channels (thus reducing parts, weight, size, cost, etc.), to reduce the dimensions and weight of the welding assembly for improved part access and maneuverability, simplify setup and alignment of critical process variables, reduce the envelop and mass of the welding head assembly, provide greater flexibility in configuring the process to suit each individual application, and to integrate process sensors as functional blocks, reducing size and complexity.

The figures illustrate exemplary configurations of the welding head assembly only, one of ordinary skill in the art will appreciate that the actual layout and configuration of the modular functional blocks may vary to suit the needs and desires of the user. In addition, while illustrative assemblies have been shown for GMAW, SAW, and HLAW processes, the present system may be used in any welding process.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features. In addition, for the sake of convenience and clarity, terms such as "front," "rear," "outer," "inner," "top," "bottom," "upper," "lower," "upwards," "downwards," "vertical," "horizontal," "lateral," "longitudinal," "height," and "width" may have been used herein to describe the relative placement and orientation of the device and its various components, each with respect to the geometry and orientation of the device as it appears in the figures. While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A welding head assembly comprising:
   a plurality of inter-connectable modular functional blocks, each modular functional block having:
      an axis extending between a proximal end and a distal end; and
      a first side having a projection and a second side having a recess, the projection configured to operatively couple to another recess of another of the modular functional blocks so that the axis of a first modular functional block is not coaxial with the axis of said another modular functional block,
   wherein the plurality of modular functional blocks is configurable in a plurality of different configurations, and the plurality of modular functional blocks includes one of a laser beam delivery block, a welding wire delivery block, a gas delivery block, and a liquid delivery block.

2. The welding head assembly of claim 1, wherein the projection comprises a dovetail and the recess comprises a groove.

3. The welding head assembly of claim 1, wherein each modular functional block of said plurality of modular functional blocks includes one or more channels for receiving and conducting flow of a fluid.

4. The welding head assembly of claim 3, wherein at least one of the one or more channels includes a threaded opening for creating a controlled flow of the fluid through said one or more channels within at least one modular functional block of the plurality of modular functional blocks.

5. The welding head assembly of claim 3, wherein, when the plurality of modular functional blocks are connected to one another, one of said one or more channels in a first modular functional block aligns with another of said one or more channels in a second modular functional block to provide for distribution of the fluid through the welding head assembly.

6. The welding head assembly of claim 5, further comprising one or more of an insulating spacer, an end plate, a cover plate, a shim plate, and a cover.

7. The welding head assembly of claim 5, wherein the plurality of modular functional blocks includes at least one sensor block comprising a touch sensor block, a tactile seam tracker block, an optical seam tracker block, or a camera.

8. The welding head assembly of claim 3, wherein, when the plurality of modular functional blocks are connected to one another, a plurality of said one or more channels formed in a first modular functional block of the plurality of modular functional blocks aligns with a plurality of said one or more channels formed in a second modular functional block of the plurality of modular functional blocks to produce a network of channels in the welding head assembly for supplying the fluid.

9. The welding head assembly of claim 3, wherein the one or more channels extend transverse to the axis of each modular functional block of the plurality of modular functional blocks.

10. The welding head assembly of claim 1, further comprising one or more of an insulating spacer, an end plate, a cover plate, a shim plate, and a cover, wherein one or more of the insulating spacer, the end plate, the cover plate, the shim plate, and the cover include a recess configured to receive the projection of one of the modular functional blocks of the plurality of modular functional blocks.

11. The welding head assembly of claim 1, wherein the plurality of modular functional blocks includes at least one sensor block comprising a touch sensor block, a tactile seam tracker block, an optical seam tracker block, or a camera.

12. The welding head assembly of claim 1, wherein each modular functional block of the plurality of modular functional blocks further includes the distal end, wherein the distal ends are coplanar.

13. The welding head assembly of claim 12, wherein at least one of the plurality of modular functional blocks further includes a tip extending from the distal end.

14. The welding head assembly of claim 1, further comprising a delivery channel extending parallel to the axis of each modular functional block of the plurality of modular functional blocks, the delivery channel configured to provide a path for one of a laser beam, a welding wire, a gas, and a liquid.

15. A kit of modular functional blocks for configuring and assembling a welding head into any one of a number of different configurations, the kit comprising:
   a plurality of inter-connectable modular functional blocks, each modular functional block having;
   an axis extending between a proximal end and a distal end; and
   a first side having a projection and a second side having a recess, the recess configured to receive another projection of another modular function block so that the axis of a first modular functional block is not coaxial with the axis of said another modular functional block, wherein the plurality of modular functional blocks is configurable in a number of different configurations, and the plurality of modular functional blocks includes one or more of a laser delivery block, a welding wire delivery block, a gas delivery block, and a liquid delivery block.

16. The kit of claim 15, wherein the projection comprises a dovetail and the recess comprises a groove.

17. The kit of claim 15, wherein each modular functional block of the plurality of modular functional blocks includes one or more channels to receive a fluid.

18. The kit of claim 17, wherein at least one of the channels includes a threaded opening for creating a controlled flow of said fluid within at least one modular functional block of the plurality of modular functional blocks.

19. The kit of claim 17, wherein, when the plurality of modular functional blocks are connected to one another, one of said channels in a first modular functional block of the plurality of modular functional blocks aligns with another of said channels in a second modular functional block of the plurality of modular functional blocks to provide for distribution of the fluid through the welding head assembled with the plurality of modular functional blocks.

20. The kit of claim 15, further comprising one or more of an insulating spacer, an end plate, a cover plate, a shim plate, and a cover,
   wherein the one or more of the insulating spacer, the end plate, the cover plate, the shim plate, and the cover each include a projection configured to operatively couple to the recess of one of the modular blocks of the plurality of modular functional blocks.

* * * * *

UNITED STATES PATENT AND TRADEMARK OFFICE
CERTIFICATE OF CORRECTION

| | | |
|---|---|---|
| PATENT NO. | : 10,870,177 B2 | Page 1 of 1 |
| APPLICATION NO. | : 15/630729 | |
| DATED | : December 22, 2020 | |
| INVENTOR(S) | : Hansen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this
Tenth Day of January, 2023

Katherine Kelly Vidal
*Director of the United States Patent and Trademark Office*